US005777071A

United States Patent [19]

Smith

[11] Patent Number: 5,777,071
[45] Date of Patent: Jul. 7, 1998

[54] WATER REDUCIBLE CURING AND SEALING COMPOUND

[75] Inventor: Paul A. Smith, Mentor-on-the-Lake, Ohio

[73] Assignee: ChemMasters, Madison, Ohio

[21] Appl. No.: 725,971

[22] Filed: Oct. 4, 1996

Related U.S. Application Data

[60] Provisional application No. 60/004,863 Oct. 5, 1995.

[51] Int. Cl.$^6$ .................... C08F 8/30; C08L 33/06
[52] U.S. Cl. .................. 528/492; 524/247; 524/562; 525/329.9
[58] Field of Search ................ 524/247, 562, 524/555; 525/329.9, 333.6; 528/492

[56] References Cited

U.S. PATENT DOCUMENTS

| | | | |
|---|---|---|---|
| 3,106,486 | 10/1963 | Harren et al. | 524/562 |
| 3,590,016 | 6/1971 | Hopwood | 524/535 |
| 3,819,567 | 6/1974 | Swanson et al. | 523/429 |
| 3,928,273 | 12/1975 | Chang et al. | 524/512 |
| 4,105,615 | 8/1978 | Balatan | 524/555 |
| 4,215,179 | 7/1980 | Melamed et al. | 428/451 |
| 4,225,651 | 9/1980 | Hutton et al. | 526/329 |
| 4,230,609 | 10/1980 | Burroway et al. | 524/251 |
| 4,233,362 | 11/1980 | Novak et al. | 428/332 |
| 4,474,926 | 10/1984 | Burroway | 524/710 |
| 4,507,454 | 3/1985 | Hutton et al. | 526/317 |
| 4,582,730 | 4/1986 | Elser et al. | 427/393 |
| 4,746,552 | 5/1988 | Tokumoto et al. | 427/403 |
| 4,902,566 | 2/1990 | Woo et al. | 428/319.9 |
| 4,968,741 | 11/1990 | Burroway et al. | 524/710 |
| 5,034,454 | 7/1991 | Maska et al. | 524/763 |
| 5,122,566 | 6/1992 | Burroway et al. | 524/710 |
| 5,198,481 | 3/1993 | Cope | 524/9 |
| 5,215,827 | 6/1993 | Dotzauer et al. | 428/500 |

*Primary Examiner*—Tae Yoon
*Attorney, Agent, or Firm*—Jones, Day, Reavis & Pogue

[57] ABSTRACT

A water-reducible curing and sealing compound for coating concrete substrates is formed by combining a water-soluble salt of an acrylic polymer resin with an alkanolamine. The resulting compound is low in volatile organic compounds (VOC) and achieves the appearance and performance characteristics of traditional curing and sealing compounds containing petroleum-based solvents. In particular, the compound comprises a polymer resin that comprises three monomers, namely a vinyl aromatic monomer, an ester of acrylic or methacrylic acid, and acrylic or methacrylic acid, in a water-miscible solvent; an alkanolamine; and water.

11 Claims, No Drawings

WATER REDUCIBLE CURING AND SEALING COMPOUND

This application claims the benefit of U.S. Provisional Application No. 60/004,863, filing date Oct. 5, 1995.

BACKGROUND OF THE INVENTION

This invention relates to an improved curing and sealing compound to be applied to freshly poured concrete. Cement-containing material in its undried state requires a curing period in order to establish the hardness and strength characteristics associated with the product. The curing process is aided by assuring that sufficient moisture is retained throughout the newly-poured concrete. It is therefore desirable to prevent moisture loss through the exposed surface of the concrete. The industry has responded to this need by developing curing compounds to be applied to the exposed surface of fresh concrete. These coatings form a moisture barrier in the form of a film or an impervious membrane, inhibiting the loss of moisture through the surface of the concrete during the curing period.

The durability and appearance characteristics of concrete can be compromised through exposure to environmental conditions, including moisture and sunlight, as well as particulate components of the air. Further, contact between the surface of the concrete and abrasive elements can adversely effect the hardness and appearance of the concrete. It is therefore desirable to protect the concrete surface from such exposure and contact. The industry has responded to this need by developing sealing compounds to be applied to the surface of the concrete to act as an abrasive-resistant coating that also protects the concrete from adverse environmental exposure.

Traditional liquid concrete curing and sealing products have contained volatile organic compounds ("VOCs"), including petroleum-based solvents, which facilitate the penetrating ability of the liquid into the concrete substrate upon application and promote adhesion of the coating to the concrete surface. VOCs have increasingly been criticized as having an adverse impact on the environment, and have been increasingly the subject of regulations concerning their use. The concrete curing and sealing industry has therefore come under pressure to reduce VOC levels in their products.

In response to this pressure, emulsion coatings have been developed that contain lesser amounts of petroleum-based solvents. Other emulsion coatings have been developed that contain non-petroleum-based solvents such as glycol-ether type solvents. The drawbacks with emulsion coatings containing reduced amounts of petroleum-based solvents include a continuing use of VOCs, an opaque or milky-white appearance of the product prior to application, and a reduced gloss upon drying. The drawbacks with emulsion coatings using glycol-ether type solvents include, again, the continued use of VOCs, breathability which inhibits use as a curing compound, and limited stability in a cycle of freezing and thawing frequently encountered in concrete applications. Therefore a need exists for a cement curing and sealing compound containing reduced amounts of VOCs that has the appearance and performance characteristics of traditional curing and sealing compounds containing petroleum-based solvents.

SUMMARY OF THE INVENTION

This invention relates to a water-reducible curing and sealing compound for concrete, formed by combining a polymer resin with an alkanolamine. It has been discovered that the high gloss and translucent appearance, as well as the curing and sealing performance, of cement curing and sealing compounds made with traditional petroleum-based solvents can be achieved by a single water-reducible polymer compound using limited amounts of non-petroleum based solvents. The coating of the present invention combines the curing and sealing functions in a single water-reducible polymer coating, and is formulated so that the coating continues to function as a sealer after the critical curing period has expired.

The coating of the present invention contains no petroleum-based solvents, and only limited amounts of glycol-ether-based solvents. The coating of the present invention is water-reducible, and is formed using a water-soluble salt of an acrylic polymer resin. The coating of the present invention has a viscosity sufficiently low to enable application through low-pressure air sprayers, in addition to brush and roll applications, and a glass transition temperature ("$T_g$") high enough to provide abrasion resistance but low enough to prevent brittleness.

In particular, the invention is a water-reducible curing and sealing compound for concrete substrates comprising the products of the reaction of 17 to 36 parts by weight of a polymer resin that comprises from about 60 to 80 percent by weight of a vinyl aromatic monomer, about 5 to 35 percent by weight of an ester of acrylic or methacrylic acid, wherein the alcohol portion of the ester has from 1 to 18 carbon atoms, and about 10 to 20 percent by weight of acrylic or methacrylic acid, in a water-miscible solvent; 1 to 3 parts by weight of an alkanolamine; and 61 to 82 parts by weight of water.

DETAILED DESCRIPTION OP THE INVENTION

The water-reducible coating and sealing compound of the present invention is formed by the addition of an alkanolamine, preferably diethylaminoethanol (DEAE) to an acrylic polymer resin. Other suitable amines within the scope of the present invention include dimethylaminoethanol (DMAE) and diethanolamine (DEA), or mixtures of these with DEAE. The polymer resin comprises three monomers. The first monomer is a vinyl aromatic, preferably styrene or vinyl toluene, or mixtures of these. The second monomer is an ester of acrylic acid or methacrylic acid and an alcohol having from 1 to 18 carbons, and is preferably 2-ethyl hexyl methacrylate. The third monomer contains an unsaturated carboxylic acid, preferably methacrylic acid or acrylic acid.

The resin is polymerized in a water-miscible solvent such as butyl carbitol. The resulting resin suitable for use in making the present invention, has a number average molecular weight ("$M_n$") of approximately 1100, and a weight average molecular weight ("$M_w$") of approximately 11150. The polydispersivity of the resin is approximately 10.07. The viscosity of the resin is between 140,000 and 160,000 centipoise, with a total solids content ("TSC") of 70% by weight.

A preferable acrylic polymer resin for use in forming the compound of the present invention is manufactured by Dock Resins Corporation, 1512 Elizabeth Avenue, Linden, N.J. under the designation "Doresco ACW51-16". The composition of this resin is approximately 60% to 80% by weight styrene, 5% to 35% by weight 2-ethyl hexyl methacrylate, and 10% to 20% by weight methacrylic acid, in butyl carbitol.

The viscosity and ease of application of the coating of the present invention are dependent on the amount of carboxylic acid used in the polymer resin. Polymer resins containing less than 10% of a carboxylic acid were not suitable for use in forming the present invention, since the resulting compound was not water-reducible upon combination with an alkanolamine.

The water-reducible curing and sealing compound for concrete substrates of the invention comprises the products of the reaction of 17 to 36 parts by weight of a polymer resin that comprises from about 60% to 80% by weight of a vinyl aromatic monomer, about 5% to 35% percent by weight of an ester of acrylic or methacrylic acid, wherein the alcohol portion of the ester has from 1 to 18 carbon atoms, and about 10% to 20% by weight or acrylic or methacrylic acid, in a water-miscible solvent; 1 to 3 parts by weight of an alkanolamine; and 61 to 82 parts by weight of water. Preferably, the compound comprises 24 to 27 parts by weight of the polymer resin, 1.5 to 2.0 parts by weight of the alkanolamine and 71 to 74.5 parts by weight of water. More preferably, the compound comprises 25.5 parts by weight of the polymer resin, 1.88 parts by weight of the alkanolamine and 72.62 parts by weight of water.

Formulations within the scope of the present invention comply with the standards set forth in ASTM C309-81 entitled "Standard Specification for Liquid Membrane-Forming Compounds For Curing Concrete", as measured in accordance with the specifications set forth in ASTM C156-74 entitled "Standard Method of Test for Water Retention by Concrete Curing Material." ASTM C309-81 provides, in regard to water retention, that the membrane forming compound shall restrict the loss of water to not more than 0.55 $kg/m^2$ of surface in a 72 hour period.

The following example illustrates an embodiment of the formulation of the coating the present invention.

EXAMPLE 1

25.5 parts by weight of Doresco ACW51-16 polymer resin, as described above, are heated to a minimum of 160° F. 1.88 parts by weight of DEAE are then added to the reaction vessel with agitation until a pH of approximately 8.5 is achieved. 72.62 parts by weight of water are then added, to achieve a TSC of approximately 18%.

The resulting liquid coating has the following properties: a density of 8.4 to 8.5 lbs./gallon, a viscosity of 20–40 centipoise, a TSC of 18 to 18.5% by weight, a pH of 8.5 to 9.0, and a $T_g$ of 40°–60° C. The compound is then ready to be applied to fresh cement, either by spraying or using a brush, roll or other contact applicator.

The coating is dry to the touch in approximately 60 minutes, and is thoroughly dry in approximately 4 to 5 hours. The coating restricts water loss from the cement to not more than 0.55 $kg/m^2$ of surface in a 72 hour period, in compliance with ASTM C309-81.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

I claim:

1. A water-reducible curing and sealing compound for concrete substrates consisting of the products of the reaction of:
   17 to 36 parts by weight of a polymer resin that comprises from about 60 to 80 percent by weight of a vinyl aromatic monomer, about 5 to 35 percent by weight of an ester of acrylic or methacrylic acid, wherein the alcohol portion of the ester has from 1 to 18 carbon atoms, and about 10 to 20 percent by weight of acrylic or methacrylic acid, in a water-miscible solvent;
   1 to 3 parts by weight of an alkanolamine; and
   61 to 82 parts by weight of water.

2. The compound of claim 1, wherein the vinyl aromatic monomer is selected from styrene, vinyl toluene, and mixtures thereof.

3. The compound of claim 1, wherein the ester is 2-ethyl hexyl methacrylate.

4. The compound of claim 1, wherein the alkanolamine is selected from diethylaminoethanol, dimethylaminoethanol, diethanolamine, and mixtures thereof.

5. The compound of claim 1, wherein the alkanolamine is diethylaminoethanol.

6. The compound of claim 1, wherein the solvent is butyl carbitol.

7. The compound of claim 1, wherein the polymer resin consists of about 60 to 80% by weight styrene, 5 to 35% by weight 2-ethyl hexyl methacrylate, and 10 to 20% by weight methacrylic acid.

8. The compound of claim 1, wherein the compound consists of 24 to 27 parts by weight of the polymer resin, 1.5 to 2.0 parts by weight of the alkanolamine and 71 to 74.5 parts by weight of water.

9. The compound of claim 1, wherein the compound consists of 25.5 parts by weight of the polymer resin, 1.88 parts by weight of the alkanolamine and 72.62 parts by weight of water.

10. A method of preparing a water-reducible curing and sealing compound for concrete substrates consisting of the steps of
   (a) forming a polymer resin from materials consisting of about 60 to 80 percent by weight of a vinyl aromatic monomer, about 5 to 35 percent by weight by weight of an ester of acrylic or methacrylic acid, wherein the alcohol portion of the ester has from 1 to 18 carbon atoms, and about 10 to 20 percent by weight of acrylic or methacrylic acid, said resin having been polymerized in a water-miscible solvent;
   (b) neutralizing 17 to 36 parts by weight of said resin with 1 to 3 parts by weight of an alkanolamine; and
   (c) adding 61 to 82 parts by weight of water.

11. A method of claim 10, wherein the vinyl aromatic monomer is selected from styrene, vinyl toluene and mixtures thereof; the ester is 2-ethyl hexyl methacrylate; and the alkanolamine is selected from diethylaminoethanol, dimethylaminoethanol, diethanolamine and mixtures thereof.

* * * * *